(12) United States Patent
Son

(10) Patent No.: US 10,061,103 B2
(45) Date of Patent: Aug. 28, 2018

(54) LENS MODULE

(71) Applicant: Samsung Electro-Mechanics Co., Ltd., Suwon-si (KR)

(72) Inventor: Ju Hwa Son, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 2 days.

(21) Appl. No.: 14/956,581

(22) Filed: Dec. 2, 2015

(65) Prior Publication Data

US 2016/0161720 A1 Jun. 9, 2016

(30) Foreign Application Priority Data

Dec. 5, 2014 (KR) ........................ 10-2014-0173877

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ........ G02B 13/0045; G02B 9/60; G02B 9/62; G02B 9/64; G02B 13/0055
USPC ................ 359/754–760, 763–764, 766–768, 359/713–714
See application file for complete search history.

(56) References Cited

U.S. PATENT DOCUMENTS

| | | | |
|---|---|---|---|
| 6,163,410 A | 12/2000 | Nagaoka | |
| 7,864,454 B1 | 1/2011 | Tang et al. | |
| 8,000,031 B1 | 8/2011 | Tsai | |
| 9,097,877 B2 | 8/2015 | Tsai et al. | |
| 2007/0279760 A1 | 12/2007 | Toyoda et al. | |
| 2010/0134904 A1 | 6/2010 | Tsai | |
| 2012/0050884 A1 | 3/2012 | Kurashige et al. | |
| 2012/0194920 A1* | 8/2012 | Huang | G02B 13/0045 359/714 |
| 2014/0049839 A1* | 2/2014 | Shinohara | G02B 13/0045 359/714 |
| 2014/0293447 A1 | 10/2014 | Noda et al. | |
| 2015/0029383 A1* | 1/2015 | Tsai | G02B 13/0045 348/335 |
| 2015/0316750 A1* | 11/2015 | Dai | G02B 9/60 359/713 |

(Continued)

FOREIGN PATENT DOCUMENTS

| | | |
|---|---|---|
| CN | 101101367 A | 1/2008 |
| CN | 201222114 Y | 4/2009 |

(Continued)

OTHER PUBLICATIONS

Taiwanese Office Action dated Dec. 28, 2016 in the corresponding Taiwanese Patent Application No. 104139291 (14 pages with English translation).

(Continued)

*Primary Examiner* — Jordan Schwartz
(74) *Attorney, Agent, or Firm* — NSIP Law

(57) ABSTRACT

A lens module, including a first lens, a second lens, a third lens, a fourth lens comprising a concave object-side surface and a concave image-side surface, and a fifth lens including a negative refractive power and an inflection point formed on an image-side surface thereof. The first to fifth lenses are sequentially disposed from an object side to an image side.

9 Claims, 16 Drawing Sheets

(56) References Cited

U.S. PATENT DOCUMENTS

| | | | |
|---|---|---|---|
| 2016/0116705 A1* | 4/2016 | Lee | G02B 9/60 |
| | | | 359/714 |
| 2016/0124191 A1* | 5/2016 | Hashimoto | G02B 13/18 |
| | | | 359/708 |
| 2016/0124192 A1* | 5/2016 | Koreeda | G02B 27/0025 |
| | | | 359/713 |
| 2016/0259150 A1* | 9/2016 | Shin | G02B 27/0025 |
| 2016/0282588 A1* | 9/2016 | Sekine | G02B 9/62 |
| 2017/0108664 A1* | 4/2017 | Sekine | G02B 13/006 |

FOREIGN PATENT DOCUMENTS

| | | |
|---|---|---|
| CN | 102385148 A | 3/2012 |
| JP | 2004-240464 A | 8/2004 |
| JP | 2011-227362 A | 11/2011 |
| TW | 200914909 A | 4/2009 |
| TW | 201106040 A1 | 2/2011 |
| TW | 201144890 A1 | 12/2011 |
| TW | 201344236 A | 11/2013 |

OTHER PUBLICATIONS

Chinese Office Action dated Apr. 13, 2018 in corresponding Chinese Patent Application No. 201510894029.3. (9 pages in English and 7 pages in Chinese).

* cited by examiner

| SURFACE NO. | RADIUS OF CURVATURE | THICKNESS/ DISTANCE | REFRACTIVE INDEX | ABBE NUMBER | EFFECTIVE RADIUS | REMARKS |
|---|---|---|---|---|---|---|
| OBJECT | Infinity | | | | | |
| ST | Infinity | | | | | STOP |
| 1 | 1.23 | 0.4812 | 1.5465 | 56.113 | 0.74476 | FIRST LENS |
| 2 | 6.8459 | 0.0400 | | | 0.68494 | |
| 3 | 4.1760 | 0.2200 | 1.6455 | 23.52 | 0.66000 | SECOND LENS |
| 4 | 1.8870 | 0.3139 | | | 0.64000 | |
| 5 | -6.6134 | 0.3246 | 1.5465 | 56.11 | 0.81276 | THIRD LENS |
| 6 | -3.7754 | 0.6129 | | | 0.99591 | |
| 7 | -154.5710 | 0.3563 | 1.6455 | 23.52 | 1.56226 | FOURTH LENS |
| 8 | 139.4415 | 0.0951 | | | 1.83588 | |
| 9 | 1.6643 | 0.6167 | 1.5365 | 55.66 | 2.31390 | FIFTH LENS |
| 10 | 1.1659 | 0.2100 | | | 2.49505 | |
| 11 | Infinity | 0.1100 | IR GLASS OR FILM | | 2.75032 | FILTER |
| 12 | Infinity | 0.5597 | | | 2.77830 | |
| IMAGE SENSOR | Infinity | -0.0003 | | | 3.04271 | |

FIG. 4

| FIRST EMBODIMENT | 1 | 2 | 3 | 4 | 5 | 6 | 7 | 8 | 9 | 10 |
|---|---|---|---|---|---|---|---|---|---|---|
| CONIC (K) | 0.0059 | 0.9908 | -8.3149 | 2.0259 | 2.0905 | -8.7171 | 1.3935 | -5.6201 | -1.5384 | -0.9726 |
| 4-TH ORDER (A) | 0.0011 | -0.3763 | -0.4393 | -0.1562 | -0.1726 | -0.1578 | 0.1535 | 0.0241 | -0.4600 | -0.4118 |
| 6-TH ORDER (B) | 0.0351 | 1.7163 | 1.8660 | 0.5031 | -0.0927 | -0.0431 | -0.2472 | -0.0137 | 0.2244 | 0.2720 |
| 8-TH ORDER (C) | -0.1375 | -6.0102 | -5.1773 | 1.6444 | 0.1726 | 0.0351 | 0.0898 | -0.0854 | -0.0500 | -0.1571 |
| 10-TH ORDER (D) | 0.4385 | 16.5097 | 12.7585 | -16.7505 | 1.2196 | 0.3330 | -0.0100 | 0.0684 | 0.0049 | 0.0667 |
| 12-TH ORDER (E) | -1.0782 | -29.6025 | -24.0198 | 62.9402 | -3.7353 | -0.5095 | -0.0100 | -0.0214 | 0.0000 | -0.0185 |
| 14-TH ORDER (F) | 1.6363 | 27.1936 | 24.8934 | -113.3214 | 5.1185 | 0.5642 | 0.0069 | 0.0031 | 0.0000 | 0.0031 |
| 16-TH ORDER (G) | -1.1761 | -9.4065 | -10.2414 | 79.9720 | -2.6042 | -0.2739 | -0.0012 | -0.0002 | 0.0000 | -0.0003 |
| 18-TH ORDER (H) | | | | | | | | | | 0.0000 |

FIG. 5

| SURFACE NO. | RADIUS OF CURVATURE | THICKNESS/ DISTANCE | REFRACTIVE INDEX | ABBE NUMBER | EFFECTIVE RADIUS | REMARKS |
|---|---|---|---|---|---|---|
| OBJECT | Infinity | | | | | |
| ST | Infinity | | | | | STOP |
| 1 | 1.2497 | 0.4712 | 1.5465 | 56.11 | 0.72331 | FIRST LENS |
| 2 | 9.7900 | 0.0400 | | | 0.66061 | |
| 3 | 6.2136 | 0.2200 | 1.6455 | 23.52 | 0.64000 | SECOND LENS |
| 4 | 2.1233 | 0.3000 | | | 0.64000 | |
| 5 | −6.9344 | 0.3564 | 1.5465 | 56.11 | 0.82494 | THIRD LENS |
| 6 | −3.5355 | 0.5841 | | | 0.97907 | |
| 7 | −22.2606 | 0.4301 | 1.6455 | 23.52 | 1.47172 | FOURTH LENS |
| 8 | 15.5040 | 0.0612 | | | 1.84429 | |
| 9 | 1.2313 | 0.5768 | 1.5365 | 55.66 | 2.32160 | FIFTH LENS |
| 10 | 1.0122 | 0.2700 | | | 2.50455 | |
| 11 | Infinity | 0.1100 | IR GLASS OR FILM | | 2.76214 | FILTER |
| 12 | Infinity | 0.5147 | | | 2.79195 | |
| IMAGE SENSOR | Infinity | 0.0055 | | | 3.04317 | |

FIG. 9

| SECOND EMBODIMENT | 1 | 2 | 3 | 4 | 5 | 6 | 7 | 8 | 9 | 10 |
|---|---|---|---|---|---|---|---|---|---|---|
| CONIC (K) | 0.1141 | 8.8890 | -3.9990 | 1.0000 | 3.0000 | 3.1441 | -4.1374 | -24.1120 | -1.7483 | -0.9320 |
| 4-TH ORDER (A) | -0.0175 | 0.0178 | 0.0211 | 0.0610 | -0.1008 | -0.0704 | 0.2678 | 0.0435 | -0.5618 | -0.5253 |
| 6-TH ORDER (B) | 0.3008 | 0.2251 | 0.0819 | 0.0610 | -0.0636 | -0.1926 | -0.5918 | -0.1390 | 0.3544 | 0.3803 |
| 8-TH ORDER (C) | -1.9805 | -2.9976 | -1.3330 | 0.0610 | 0.1086 | 0.4106 | 0.6222 | 0.1368 | -0.1295 | -0.2219 |
| 10-TH ORDER (D) | 7.7076 | 17.4891 | 7.2736 | 0.0095 | 0.1086 | -0.3607 | -0.4318 | -0.1007 | 0.0312 | 0.0888 |
| 12-TH ORDER (E) | -17.0393 | -54.9082 | -22.2359 | -0.0199 | 0.1086 | -0.0400 | 0.1416 | 0.0420 | -0.0049 | -0.0227 |
| 14-TH ORDER (F) | 20.1771 | 84.1354 | 31.1666 | 0.0610 | 0.0509 | 0.5455 | -0.0100 | -0.0086 | 0.0004 | 0.0035 |
| 16-TH ORDER (G) | -10.0982 | -51.3067 | -17.1176 | 0.0602 | -0.1008 | -0.3097 | -0.0023 | 0.0007 | 0.0000 | -0.0003 |
| 18-TH ORDER (H) | | | | | | | | | | 0.0000 |

FIG. 10

| SURFACE NO. | RADIUS OF CURVATURE | THICKNESS/ DISTANCE | REFRACTIVE INDEX | ABBE NUMBER | EFFECTIVE RADIUS | REMARKS |
|---|---|---|---|---|---|---|
| OBJECT | Infinity | | | | | |
| ST | Infinity | | | | | STOP |
| 1 | 1.1574 | 0.4978 | 1.5465 | 56.11 | 0.76658 | FIRST LENS |
| 2 | 4.5876 | 0.0618 | | | 0.69217 | |
| 3 | 5.3387 | 0.2200 | 1.6563 | 21.49 | 0.67000 | SECOND LENS |
| 4 | 2.2310 | 0.2860 | | | 0.63000 | |
| 5 | -9.3593 | 0.2805 | 1.5465 | 56.11 | 0.77542 | THIRD LENS |
| 6 | -5.1633 | 0.6170 | | | 0.95188 | |
| 7 | 77.0966 | 0.3985 | 1.6455 | 21.49 | 1.46852 | FOURTH LENS |
| 8 | 25.8527 | 0.1228 | | | 1.74571 | |
| 9 | 1.8135 | 0.6000 | 1.5365 | 55.66 | 2.29711 | FIFTH LENS |
| 10 | 1.2557 | 0.2255 | | | 2.49758 | |
| 11 | Infinity | 0.1100 | IR GLASS OR FILM | | 2.77023 | FILTER |
| 12 | Infinity | 0.5213 | | | 2.79997 | |
| IMAGE SENSOR | Infinity | -0.0013 | | | 3.03736 | |

FIG. 14

| THIRD EMBODIMENT | 1 | 2 | 3 | 4 | 5 | 6 | 7 | 8 | 9 | 10 |
|---|---|---|---|---|---|---|---|---|---|---|
| CONIC (K) | 0.1227 | 1.0000 | -1.4886 | 3.1011 | 2.0000 | -8.7206 | -1.2851 | -5.6138 | -1.4377 | -0.9969 |
| 4-TH ORDER (A) | -0.0025 | -0.2203 | -0.3107 | -0.1309 | -0.2126 | -0.1662 | 0.1153 | -0.0237 | -0.4928 | -0.4116 |
| 6-TH ORDER (B) | 0.0512 | 0.6220 | 0.8333 | 0.4660 | -0.1633 | -0.0658 | -0.3981 | -0.1010 | 0.2960 | 0.2927 |
| 8-TH ORDER (C) | -0.2217 | -1.5988 | -1.0091 | 1.0000 | 1.2088 | 0.1968 | 0.4950 | 0.1413 | -0.1028 | -0.1707 |
| 10-TH ORDER (D) | 0.8046 | 4.6830 | 1.1962 | -8.7253 | -4.0897 | 0.0570 | -0.4542 | -0.1340 | 0.0242 | 0.0700 |
| 12-TH ORDER (E) | -1.5617 | -8.6510 | -1.9471 | 30.4738 | 9.8889 | -0.3696 | 0.2246 | 0.0669 | -0.0038 | -0.0185 |
| 14-TH ORDER (F) | 1.6939 | 7.4900 | 1.0466 | -52.7942 | -12.2115 | 0.7093 | -0.0500 | -0.0158 | 0.0004 | 0.0029 |
| 16-TH ORDER (G) | -0.7018 | -2.3509 | 0.1780 | 37.5019 | 6.4797 | -0.4211 | 0.0037 | 0.0014 | 0.0000 | -0.0003 |
| 18-TH ORDER (H) | | | | | | | | | | 0.0000 |

FIG. 15

LENS MODULE

CROSS-REFERENCE TO RELATED APPLICATION

This application claims the priority and benefit under 35 USC § 119 of Korean Patent Application No. 10-2014-0173877 filed on Dec. 5, 2014, with the Korean Intellectual Property Office, the disclosure of which is incorporated herein by reference.

BACKGROUND

1. Field

The following description relates to a lens module having an optical system including five lenses.

2. Description of Related Art

A lens module mounted in a camera of a mobile communications terminal commonly includes a plurality of lenses. For example, the lens module includes five lenses as a high-resolution optical system.

However, when the high-resolution optical system is configured with the lenses as described above, a focal length, which is a distance from an object-side surface of a first lens to an image sensor, of the optical system increases. In this case, it may be difficult to mount the lens module in a thinned mobile communications terminal. Therefore, a demand exists on a development of a lens module in which a length of an optical system is reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a lens module, including: a first lens; a second lens; a third lens; a fourth lens including a concave object-side surface and a concave image-side surface; and a fifth lens including a negative refractive power and an inflection point formed on an image-side surface thereof, wherein the first to fifth lenses are sequentially disposed from an object side to an image side.

The first lens may include a positive refractive power.
The second lens may include a negative refractive power.
The third lens may include a positive refractive power.
The fourth lens may include a negative refractive power.
The fourth lens may include an inflection point formed on an object-side surface of the fourth lens.
The fourth lens may include an inflection point formed on an image-side surface of the fourth lens.

TTL/(ImgH*2)<0.67 may be satisfied, where TTL is a distance from an object-side surface of the first lens to an image sensor, and ImgH is a maximum height of the image sensor.

0.08<(D11/TTL)*ImgH<0.09 may be satisfied, where D11 is a thickness of a filter, TTL is a distance from an object-side surface of the first lens to an image sensor, and ImgH is a maximum height of the image sensor.

0.8<BFL/f<0.9 may be satisfied, where BFL is a distance from the image-side surface of the fifth lens to an image sensor, and f is an overall focal length of an optical system including the first to fifth lenses.

D2/f<0.12 may be satisfied, where D2 is a distance from an image-side surface of the first lens to an object-side surface of the second lens, and f is an overall focal length of an optical system including the first to fifth lenses.

0.30<r10/f<0.36 may be satisfied, where r10 is a radius of curvature of the image-side surface of the fifth lens, and f is an overall focal length of an optical system including the first to fifth lenses.

In accordance with an embodiment, there is provided a lens module, including: a first lens including a meniscus shape; a second lens including a meniscus shape; a third lens including a meniscus shape; a fourth lens including a concave object-side surface and a concave image-side surface; and a fifth lens including a negative refractive power, a concave image-side surface, and an inflection point formed on the image-side surface of the fifth lens, wherein the first to fifth lenses are sequentially disposed from an object side to an image side.

The first lens may include a convex object-side surface, or a concave image-side surface.

The second lens may include a convex object-side surface, or a concave image-side surface.

The third lens may include a concave object-side surface, or a convex image-side surface.

In accordance with an embodiment, there is provided a lens module, including: lenses sequentially disposed from an object side to an image side; and a fourth lens of the lenses including an object-side surface including inflection points and a concave image-side surface, wherein a first distance from an optical axis to a first inflection point is greater than a second distance from the first inflection point to a second inflection point, and a third distance from the second inflection point to a third inflection point is greater than a fourth distance from the third inflection point to a fourth inflection point.

The first lens may include a positive refractive power, the second lens may include a negative refractive power, the third lens may include a positive refractive power, the fourth lens may include a negative refractive power, and the fifth lens may include a negative refractive power.

A fifth lens may have a refractive power stronger than a refractive power of first through the fourth lenses, and a second lens may have a refractive power weakest than a refractive power of the first, the third, and the fourth lenses.

The fourth lens may have a refractive power stronger than a refractive power of a first, a second, a third, and a fifth lenses, and the second lens may have a refractive power weakest than a refractive power of the first, the third, and the fifth lenses.

In accordance with an embodiment, there is provided a lens module, including: lenses sequentially disposed from an object side to an image side; a second lens; a fourth lens of the lenses including an object-side surface including inflection points and a concave image-side surface; and a fifth lens of the lenses including a negative refractive power and an inflection point formed on an image-side surface thereof, wherein an effective radii of first through the fifth lenses is gradually decreased from an object-side surface of the first lens to an image-side surface of the second lens, and the effective radii is gradually increased from the image-side surface of the second lens to the image-side surface of the fifth lens.

The first lens may include a positive refractive power, the second lens may include a negative refractive power, the third lens may include a positive refractive power, the fourth lens may include a negative refractive power, and the fifth lens may include a negative refractive power.

The first lens may include a convex object-side surface and a concave image-side surface, the second lens may include a convex object-side surface and a concave image-side surface, the third lens may include a concave object-side surface and a convex image-side surface, the fourth lens may include a convex object-side surface and an inflection point formed on an image-side surface, and the fifth lens may include a convex object-side surface.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 4 is a table illustrating characteristics of lenses illustrated in FIG. 1;

FIG. 5 is a table illustrating aspherical surface coefficients of the lens module illustrated in FIG. 1;

FIG. 9 is a table illustrating characteristics of lenses illustrated in FIG. 6;

FIG. 10 is a table illustrating aspherical surface coefficients of the lens module illustrated in FIG. 6;

FIG. 14 is a table illustrating characteristics of lenses illustrated in FIG. 11;

FIG. 15 is a table illustrating aspherical surface coefficients of the lens module illustrated in FIG. 11.

Figure 1:
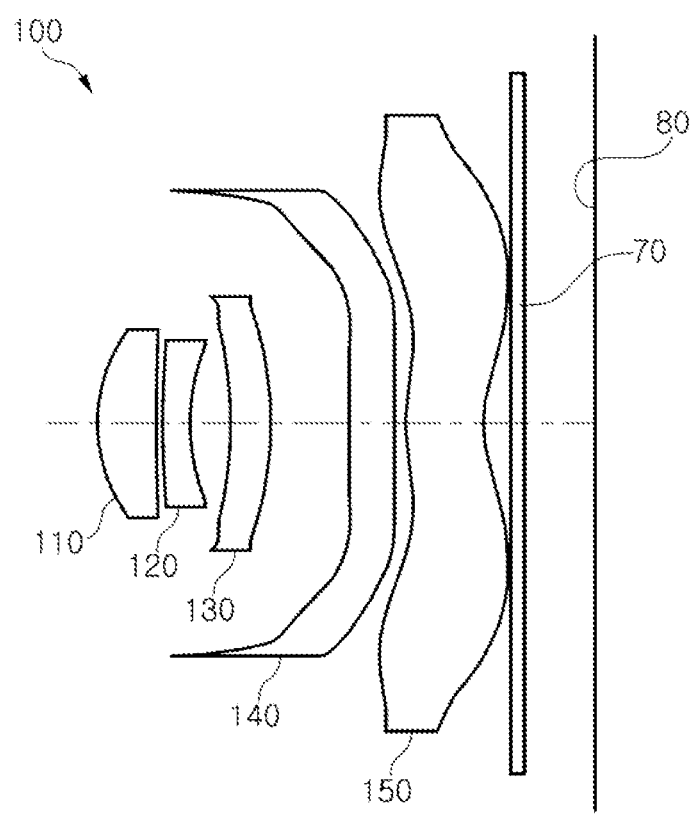
FIG. 1 is a view of a lens module, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

In one illustrative example, a first lens refers to a lens closest to an object or a subject from which an image is capture. A fifth lens is a lens closest to an image sensor or imaging sensor. Further, a first surface of each lens refers to a surface thereof closest to the object or the subject, and a second surface of each lens refers to a surface thereof closest to an image sensor or imaging sensor. Further, all radii of curvature, thicknesses, optical axis distances from the first surface of the first lens to the image sensor (OALs), a distance on the optical axis between the stop and the image sensor (SLs), image heights (ImgHs), and back focus lengths (BFLs) of the lenses, an overall focal length of an optical system, and a focal length of each lens are indicated in millimeters (mm). Further, thicknesses of lenses, gaps between the lenses, OALs, and SLs are distances measured based on an optical axis of the lenses.

Further, concerning shapes of the lenses, a surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

A lens module includes an optical system with a plurality of lenses. In one embodiment, the optical system of the lens module includes five lenses having refractive power. However, the lens module is not limited to including the five lenses. The lens module may include from four lenses up to six lenses without departing from the scope of the embodiments herein described. In accordance with an illustrative example, the embodiments described of the optical system include five lenses with a particular refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

Further, the lens module includes other components that do not have refractive power, such as a stop to control an amount of light. The lens module may also include an infrared cut-off filter for blocking infrared light. The lens module may also include an image sensor, for instance, an imaging device, to convert light reflected from an image of a subject passing through the optical system into electrical signals. The lens module may also include a gap maintaining member for adjusting a gap between lenses. In one illustrative embodiment, the gap maintaining member adjusts each lens to be at a distance from each other and the filter. However, in an alternative embodiment, the gap maintaining member may adjust each lens so that at least two of the lenses are in contact with each other, while the other lenses and the filter have a predetermined gap there between. In a further embodiment, the gap maintaining member may adjust each lens so that at least two of the lenses are in contact with each other, while the other lenses have a gap there between and at least one of the lenses is in contact with the filter.

First to fifth lenses are formed using a material having a refractive index different from that of air. For example, the first to fifth lenses are formed of plastic or glass. In an example, at least one of the first to fifth lenses has an aspherical surface shape. In another example, only the fifth lens of the first to fifth lenses has the aspherical surface shape. Further, at least one surface of each of the first to fifth lenses may be aspherical. For instance, the aspherical surface of each lens is represented by the following Equation 1:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 1]

In an example, c is an inverse of a radius of curvature of a corresponding lens, K is a conic constant, and r is a distance from a certain point on an aspherical surface to an optical axis in a direction perpendicular to the optical axis. In addition, constants A to J sequentially refer to 4-th order to 20-th order aspherical surface coefficients. In addition, Z refers to a distance between the certain point on the aspherical surface at the distance r and a tangential plane meeting the apex of the aspherical surface of the lens.

The optical system configuring the lens module has a wide field of view (FOV) of 78 degrees or more. Therefore, the lens module, according to an embodiment, may easily capture an image is observable at a wide field of view.

The lens module includes the first to fifth lenses. In addition, the lens module also includes a filter and an image sensor. Next, the above-mentioned components will be described.

Each of the first through fifth lenses has a refractive power, either negative or positive. For instance, in one configuration, the first lens has a positive refractive power.

The first lens has a meniscus shape. The first lens has the meniscus shape, of which a first surface or object-side surface is convex and a second surface or image-side surface is concave. In an alternative embodiment, the first surface or the object-side surface of the first lens is convex and the second surface or the image-side surface is flat or substantially flat.

The first lens has an aspherical surface. For example, both surfaces of the first lens are aspherical. The first lens is formed of a material having relatively high light transmissivity and excellent workability. For example, the first lens is formed using a plastic material or other organic polymers. However, a material of the first lens is not limited thereto. For example, the first lens is formed of glass.

The second lens has a refractive power. For example, the second lens has a negative refractive power.

The second lens has a meniscus shape. In one embodiment, the second lens has a meniscus shape, of which a first surface is convex and a second surface is concave. In an alternative embodiment, the first surface or the object-side surface of the second lens is flat or substantially flat and the second surface or the image-side surface is concave.

The second lens has an aspherical surface. In one example, an image-side surface of the second lens is aspherical. The second lens may be formed of a material having relatively high light transmissivity and excellent workability. In one example, the second lens is formed of plastic or other organic polymers. However, a material of the second lens is not limited thereto. For example, the second lens may be formed of glass.

The second lens is formed of a material having a high refractive index. For example, the second lens is formed of a material having a refractive index of 1.60 or more. In this example, the second lens has an Abbe number of 24 or less. The second lens formed of this material easily refracts light, even while having a relatively small curvature. Therefore, in some of the many advantages associated with the present embodiment, the second lens formed of this material may be easily manufactured and be usefully used to lower a defect rate depending on a manufacturing tolerance. In addition, the second lens permits a distance between lenses to be decreased, in which enables miniaturization of the lens module.

The third lens has a refractive power. Here, the third lens has a positive refractive power.

The third lens may have a meniscus shape. For example, the third lens may have a meniscus shape, of which an object-side surface is concave and an image-side surface is convex.

The third lens has an aspherical surface. For example, both surfaces of the third lens are aspherical. The third lens is formed of a material having high light transmissivity and excellent workability. For example, the third lens may be formed of plastic or glass.

The fourth lens has a refractive power. For example, the fourth lens may have negative refractive power.

One surface of the fourth lens may be concave. As an example, the fourth lens may have a first surface that is concave. As another example, the fourth lens may have a second surface that is concave. As another example, both surfaces of the fourth lens may be concave.

The fourth lens may have an aspherical surface. For example, both surfaces of the fourth lens are aspherical. The fourth lens is formed of a material having high light transmissivity and excellent workability. For example, the fourth lens is formed of plastic or glass.

The fourth lens includes an inflection point. For example, four or more inflection points are formed on an object-side surface of the fourth lens. As another example, one or more inflection points are formed on an image-side surface of the fourth lens. In one example, the image-side surface of the fourth lens is flat or substantially in a paraxial region and gradually curves to be convex at an edge portions thereof. In another example, the image-side surface of the fourth lens is concave in a paraxial region and gradually curves to be convex at an edge portions thereof. The fourth lens configured as described above may be usefully used to correct Petzval field curvature.

The fourth lens is formed of a material having a relatively high refractive index. For example, the fourth lens may be formed of a material having a refractive index of 1.60 or more. In an example, the fourth lens has an Abbe number of 30 or less. The fourth lens formed of this material easily refracts light while having even a relatively small curvature. Therefore, the fourth lens formed of this material is easily manufactured and is configured to lower a defect rate, depending on a manufacturing tolerance. In addition, the fourth lens formed of this material allows a distance between lenses to be decreased, such that it may be useful in miniaturizing the lens module.

The fifth lens has refractive power. For example, the fifth lens has a negative refractive power.

The fifth lens has a meniscus shape. As an example, the fifth lens has a meniscus shape, of which a first surface is convex and a second surface is concave.

The fifth lens includes an inflection point. As an example, one or more inflection points are formed on an object-side surface of the fifth lens. As another example, one or more inflection points are formed on an image-side surface of the fifth lens. The object-side surface of the fifth lens configured as described above has a convex part and a concave part alternately formed thereon. Similarly, the image-side surface of the fifth lens is concave around the optical axis thereof and is convex at an edge portion thereof. In an embodiment, the image-side surface of the fifth lens is concave in a paraxial region and gradually curves to be convex towards edge portions thereof.

The fifth lens has an aspherical surface. For example, both surfaces of the fifth lens are aspherical. The fifth lens is formed of a material having relatively high light transmissivity and excellent workability. For example, the fifth lens may be formed of plastic or other organic polymers. However, a material of the fifth lens is not limited thereto. For example, the fifth lens may be formed of glass.

A person of ordinary skill in the relevant art will appreciate that each of the first through fifth lenses may be configured in an opposite refractive power from the configuration described above. For example, in an alternative configuration, the first lens has a negative refractive power, the second lens has a positive refractive power, the third lens has a negative refractive power, the fourth lens has a positive refractive power, and the fifth lens has a negative refractive power.

The filter partially blocks incident light incident through the first to fifth lenses. As an example, the filter is an infrared cut-off filter blocking infrared wavelengths of light from the incident light. The filter is formed using a plastic material or glass and has an Abbe number of 60 or less.

The image sensor is configured to implement a relatively high level of resolution, for example, 1300 megapixels. For example, a unit size of the pixels configuring the image sensor is 1.12 μm or less.

The lens module has a wide field of view. For example, the lens module has a field of view of approximately 80 degrees or more. In addition, the lens module has a relatively short length. For example, an overall length TTL, which is a distance from the object-side surface of the first lens to the image sensor, of the optical system configuring the lens module is 4.0 mm or less. Therefore, the lens module, according to an embodiment, is used in product miniaturization.

The lens module satisfies at least one of the following Conditional Expressions:

$$TTL/(ImgH*2)<0.67 \quad \text{[Conditional Expression 1]}$$

$$TTL/(ImgH*2)<0.65 \quad \text{[Conditional Expression 2]}$$

In one example, TTL is a distance from an object-side surface of the first lens to an image sensor, and ImgH is a maximum height of the image sensor.

The Conditional Expressions 1 and 2 are conditions to miniaturize the lens module and implement relatively high resolution. As an example, in a case in which $TTL/(ImgH*2)$ is outside of an upper limit value of the above Conditional Expressions 1 or 2, because the lens module has a large value of TTL, it may be difficult to miniaturize the lens module. As another example, in a case in which $TTL/(ImgH*2)$ is outside of the upper limit value of the above Conditional Expressions 1 or 2, because the lens module has a relatively small size of the image sensor, it may be difficult to implement relatively high resolution.

In addition, the lens module satisfies at least one of the following Conditional Expressions:

$$0.08<(D11/TTL)*ImgH<0.09 \quad \text{[Conditional Expression 3]}$$

$$0.10<D11<0.12 \quad \text{[Conditional Expression 4]}$$

In an example, D11 is a thickness of the filter, TTL is a distance from an object-side surface of the first lens to an image sensor, and ImgH is a maximum height of the image sensor.

The above Conditional Expressions 3 and 4 are conditions for the filter. As an example, the filter satisfying numerical ranges of the above Conditional Expressions 3 and 4 may effectively block wavelengths of light unnecessary to implement high resolution while enabling the lens module to be miniaturized. As another example, the filter, which is outside of the numerical ranges of the above Conditional Expressions 3 or 4, may be used to remove the unnecessary wavelengths of light, but may increase a length of the lens module.

In addition, the lens module satisfies the following Conditional Expression:

$$0.8<BFL/f<0.9 \quad \text{[Conditional Expression 5]}$$

In one example, BFL is a distance from the image-side surface of the fifth lens to the image sensor, and f is an overall focal length of the optical system including the first to fifth lenses.

The above Conditional Expression 5 is another condition to miniaturize the lens module and implement a relatively high resolution. As an example, in a case in which BFL/f is outside of the numerical range of the above Conditional Expression 5, the distance from the fifth lens to the image sensor is excessively large or small, such that it may be difficult for the lens module to implement a relatively high resolution.

In addition, the lens module may satisfy at least one of the following Conditional Expressions:

$$D2/f<0.12 \quad \text{[Conditional Expression 6]}$$

$$D2<0.06 \quad \text{[Conditional Expression 7]}$$

In one example, D2 is a distance from the image-side surface of the first lens to the object-side surface of the second lens, and f is the overall focal length of the optical system including the first to fifth lenses.

The above Conditional Expressions 6 and 7 are conditions to allow for an appropriate distance between the first lens and the second lens.

In addition, the lens module may satisfy at least one of the following Conditional Expressions:

$$0.30 < r10/f < 0.36 \quad \text{[Conditional Expression 8]}$$

$$1.00 < r10 < 1.26 \quad \text{[Conditional Expression 9]}$$

In one example, r10 is a radius of curvature of the image-side surface of the fifth lens, and f is the overall focal length of the optical system including the first to fifth lenses.

The above Conditional Expressions 8 and 9 are conditions to obtain an appropriate design of the fifth lens.

A lens module, according to a first embodiment, will be described with reference to FIG. 1.

A lens module 100 includes an optical system including a first lens 110, a second lens 120, a third lens 130, a fourth lens 140, and a fifth lens 150. In addition, the lens module 100 includes an infrared cut-off filter 70 and an image sensor 80. Further, the lens module 100 further includes a stop (ST). For example, the stop is disposed between an object side and the first lens.

In the various embodiments, the first lens 110 has a positive refractive power of which an object-side surface is convex and an image-side surface is concave. The second lens 120 has a negative refractive power of which an object-side surface is convex and an image-side surface is concave. The third lens 130 has a positive refractive power of which an object-side surface is concave and an image-side surface is convex. The fourth lens 140 has a negative refractive power of which an object-side surface is concave and an image-side surface is concave. In addition, the fourth lens 140 has a shape in which four or more inflection points are formed on the object-side surface thereof. This shape may be useful to correct Petzval field curvature of the fourth lens 140. The fifth lens 150 has a negative refractive power of which an object-side surface is convex and an image-side surface is concave. In addition, one or more inflection points are formed on each of the object-side surface and the image-side surface of the fifth lens.

In an embodiment, all of the second lens 120, the fourth lens 140, and the fifth lens 150 may have negative refractive power. Among these lenses, in one example, the fifth lens 150 has the strongest refractive power, and the second lens 120 as the weakest refractive power.

Figure 2:
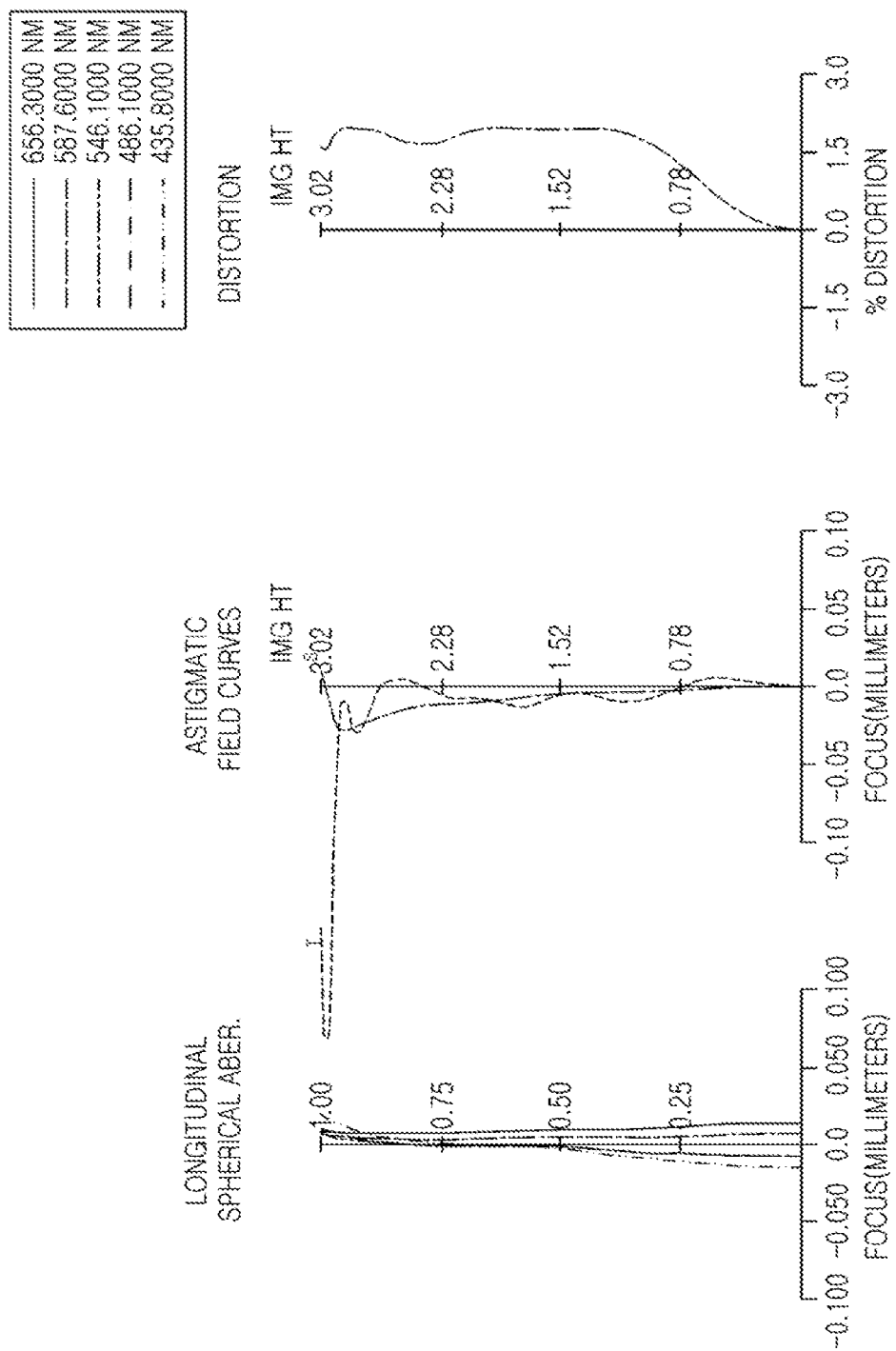
FIG. 2 is graphs having curves illustrating modulation transfer function (MTF) characteristics of the lens module illustrated in FIG. 1.
Figure 3:
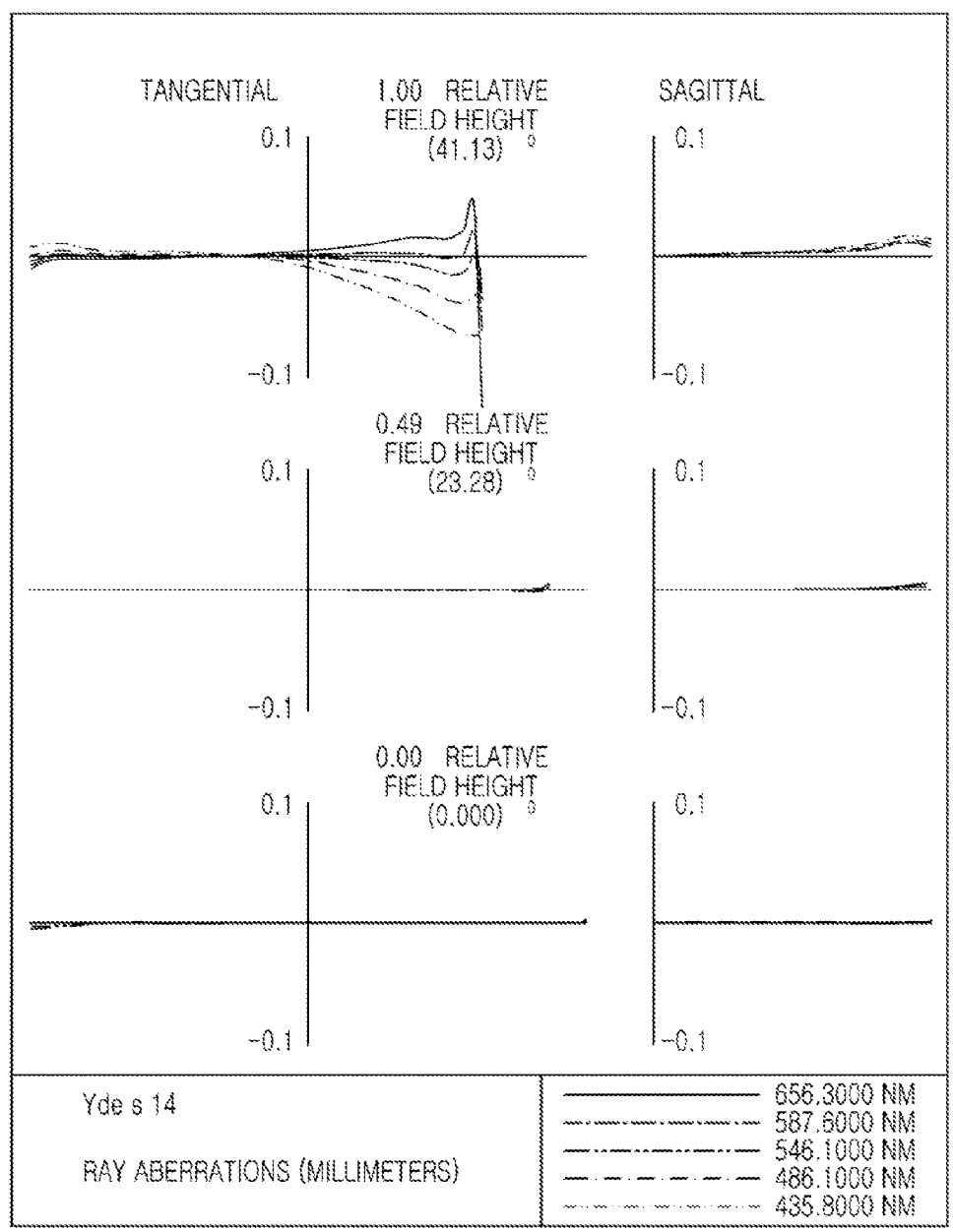
FIG. 3 is graphs having curves illustrating aberration characteristics of the lens module illustrated in FIG. 1.

FIGS. 2 and 3 are graphs having curves illustrating modulation transfer function (MTF) characteristics and aberration characteristics of the lens module.

FIG. 4 is a table illustrating characteristics of the lenses configuring the lens module. In FIG. 4, Surface Nos. 1 and 2 represent the first surface (object-side surface) and the second surface (image-side surface) of the first lens, and Surface Nos. 3 and 4 represent the first and second surfaces of the second lens, respectively. Similarly, Surface Nos. 5 to 10 represent the first and second surfaces of the third to fifth lenses, respectively. In addition, Surface Nos. 11 and 12 represent first and second surfaces of the infrared cut-off filter.

Furthermore, effective radii of the lenses may be gradually decreased from the object-side surface of the first lens to the image-side surface of the second lens, while being gradually increased from the image-side surface of the second lens to the image-side surface of the fifth lens, as illustrated in FIG. 4.

FIG. 5 is a table illustrating aspherical surface coefficients of the lenses configuring the lens module, in accordance with an embodiment. In FIG. 5, Surface Nos. of the first to fifth lenses are provided in the top row of the table, while characteristics corresponding to respective surfaces of the lenses are provided in columns therebelow.

Figure 6:
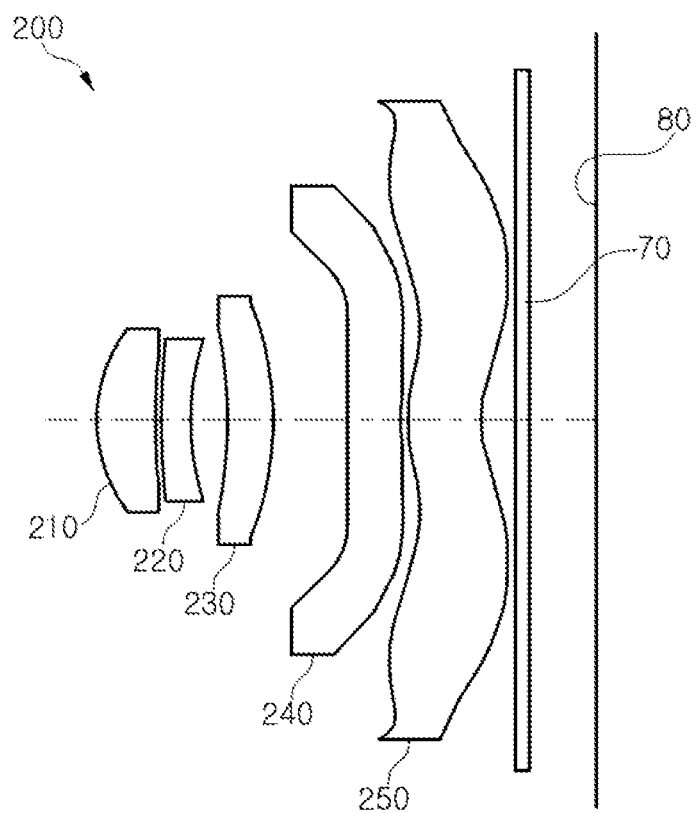
FIG. 6 is a view of a lens module, according to a second embodiment.

A lens module, according to a second embodiment in the present disclosure will be described with reference to FIG. 6.

A lens module 200 includes an optical system including a first lens 210, a second lens 220, a third lens 230, a fourth lens 240, and a fifth lens 250. In addition, the lens module 200 includes an infrared cut-off filter 70 and an image sensor 80. Further, the lens module 200 further includes a stop (ST). For example, the stop is disposed between an object side and the first lens.

In an embodiment, the first lens 210 has a positive refractive power of which an object-side surface is convex and an image-side surface is concave. The second lens 220 has a negative refractive power of which an object-side surface is convex and an image-side surface is concave. The third lens 230 has a positive refractive power of which an object-side surface is concave and an image-side surface is convex. The fourth lens 240 has a negative refractive power of which an object-side surface is concave and an image-side surface is concave. In addition, the fourth lens 240 has a shape in which four or more inflection points are formed on the object-side surface thereof. This shape is configured to correct Petzval field curvature of the fourth lens 240. The fifth lens 250 has a negative refractive power of which an object-side surface is convex and an image-side surface is concave. In addition, one or more inflection points are formed on each of the object-side surface and the image-side surface of the fifth lens.

In an embodiment, all of the second lens 220, the fourth lens 240, and the fifth lens 250 have negative refractive power. Among these lenses, the fourth lens 240 has the strongest refractive power, and the second lens 220 has the weakest refractive power.

Figure 7:
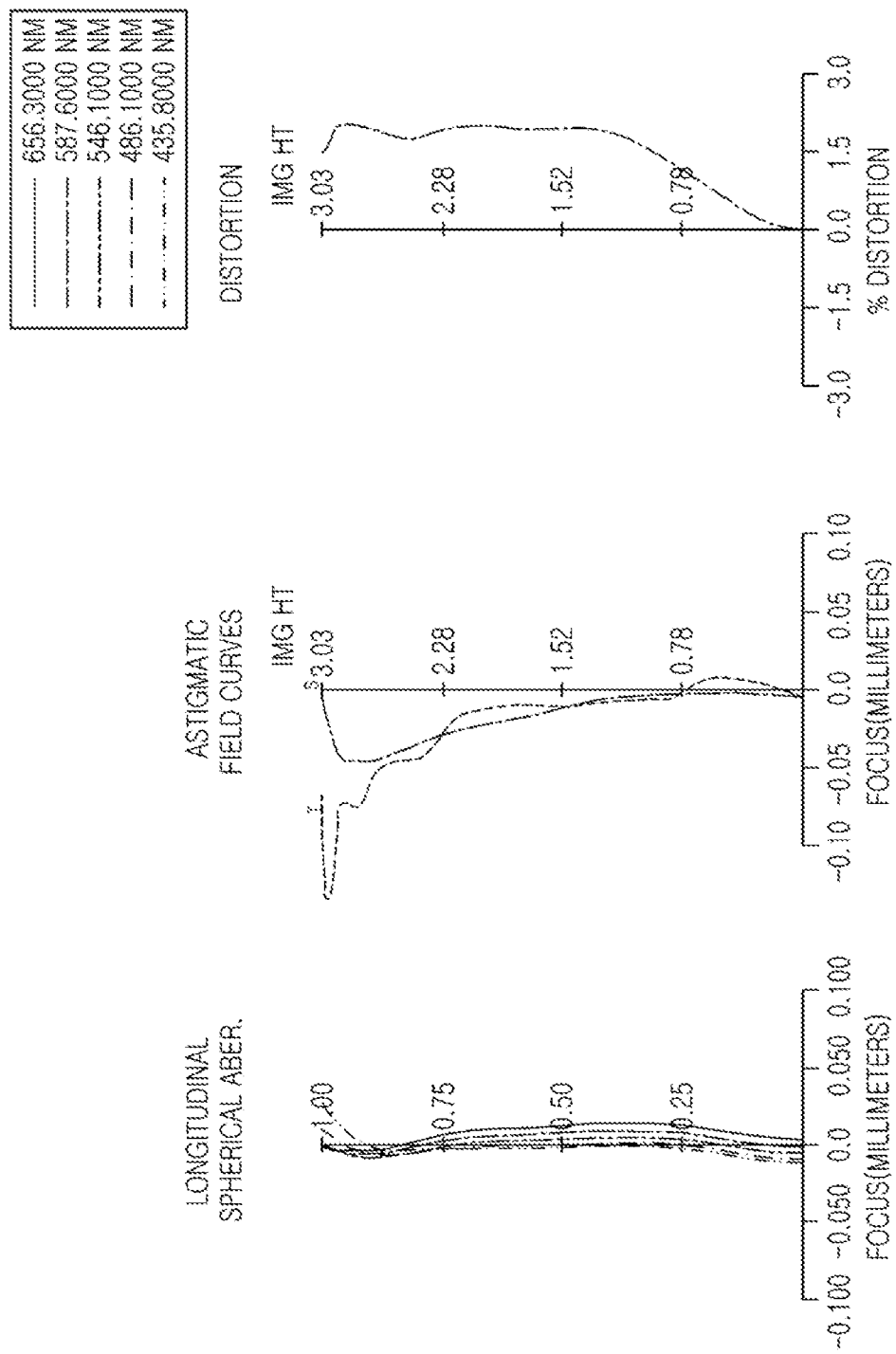
FIG. 7 is graphs having curves illustrating MTF characteristics of the lens module illustrated in FIG. 6.
Figure 8:
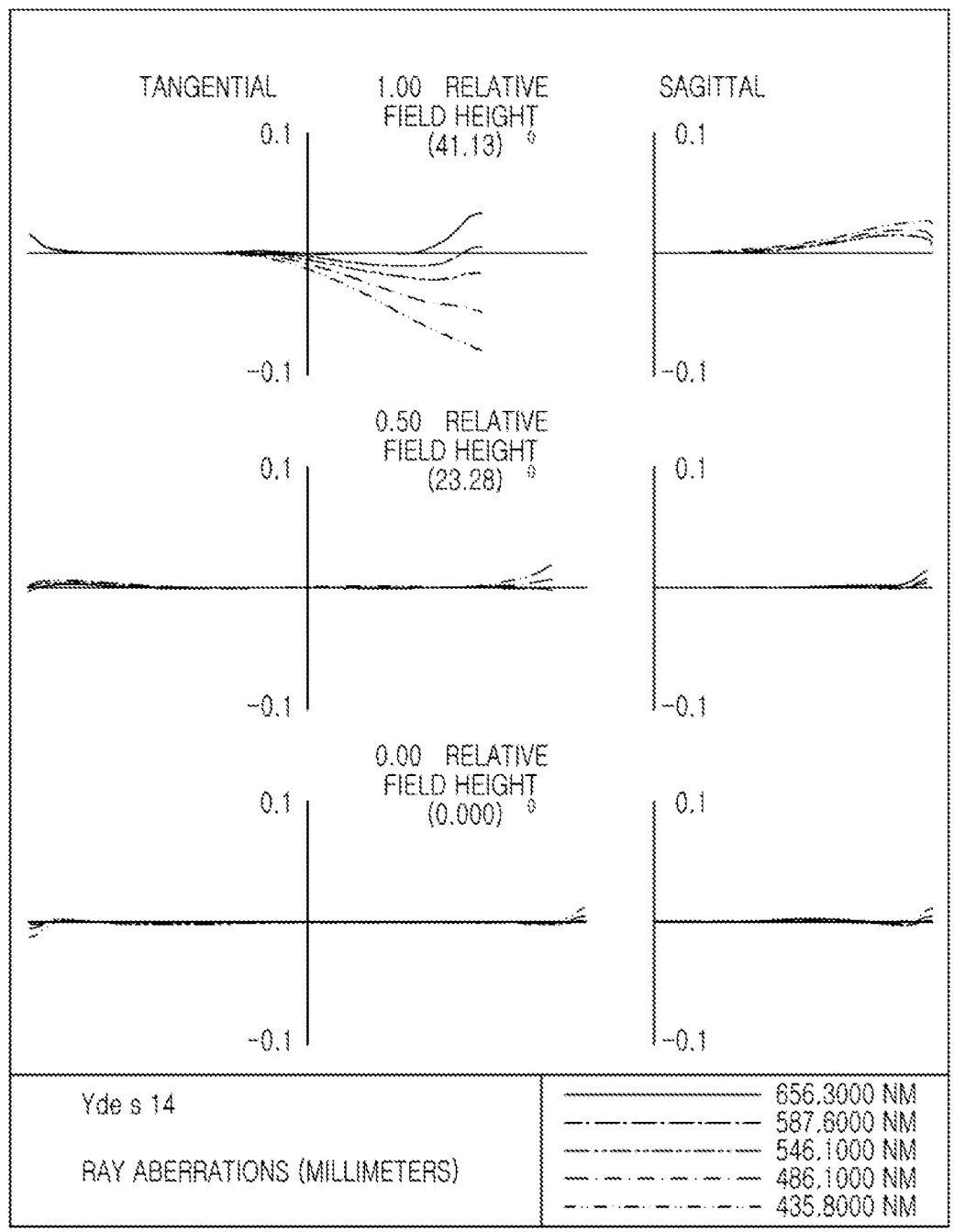
FIG. 8 is graphs having curves illustrating aberration characteristics of the lens module illustrated in FIG. 6.

FIGS. 7 and 8 are graphs having curves illustrating MTF characteristics and aberration characteristics of the lens module, in accordance with an embodiment.

FIG. 9 is a table illustrating characteristics of the lenses configuring the lens module. In FIG. 9, Surface Nos. 1 and 2 represent the first surface (object-side surface) and the second surface (image-side surface) of the first lens, and Surface Nos. 3 and 4 represent the first and second surfaces of the second lens, respectively. Similarly, Surface Nos. 5 to 10 represent the first and second surfaces of the third to fifth lenses, respectively. In addition, Surface Nos. 11 and 12 represent first and second surfaces of the infrared cut-off filter.

Furthermore, effective radii of the lenses is gradually decreased from the object-side surface of the first lens to the image-side surface of the second lens while being gradually increased from the image-side surface of the second lens to the image-side surface of the fifth lens, as illustrated in FIG. 9.

FIG. 10 is a table illustrating aspherical surface coefficients of the lenses configuring the lens module, in accordance with an embodiment. In FIG. 10, Surface Nos. of the first to fifth lenses are provided in the top row of the table, while characteristics corresponding to respective surfaces of the lenses are provided in columns therebelow.

Figure 11:
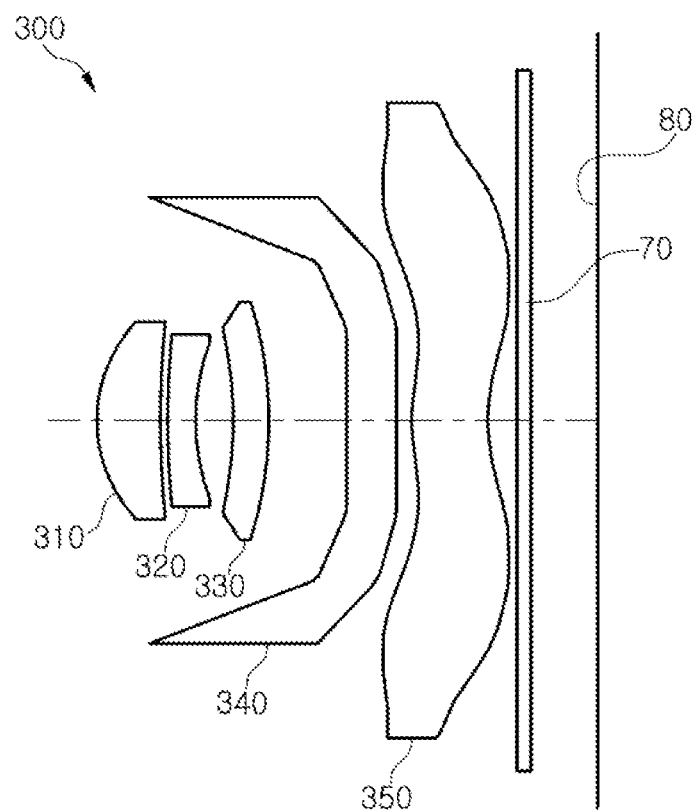
FIG. 11 is a view of a lens module, according to a third embodiment.

A lens module according to a third embodiment will be described with reference to FIG. 11.

A lens module 300 includes an optical system including a first lens 310, a second lens 320, a third lens 330, a fourth lens 340, and a fifth lens 350. In addition, the lens module 300 includes an infrared cut-off filter 70 and an image sensor 80. Further, the lens module 300 may further include a stop (ST). For example, the stop may be disposed between an object side and the first lens.

In an embodiment, the first lens 310 has a positive refractive power of which an object-side surface is convex and an image-side surface is concave. The second lens 320 has a negative refractive power of which an object-side surface is convex and an image-side surface is concave. The third lens 330 has a positive refractive power of which an object-side surface is concave and an image-side surface is convex. The fourth lens 340 has a negative refractive power of which an object-side surface is convex and an image-side surface is concave. In addition, the fourth lens 340 has a shape in which four or more inflection points are formed on the object-side surface thereof. This embodiment is used to correct Petzval field curvature of the fourth lens 340. The fifth lens 350 has a negative refractive power of which an object-side surface is convex and an image-side surface is concave. In addition, one or more inflection points are formed on each of the object-side surface and the image-side surface of the fifth lens.

In an embodiment, all of the second lens 320, the fourth lens 340, and the fifth lens 350 have negative refractive power. Among these lenses, the fourth lens 340 has the strongest refractive power, and the second lens 320 has the weakest refractive power.

Figure 12:
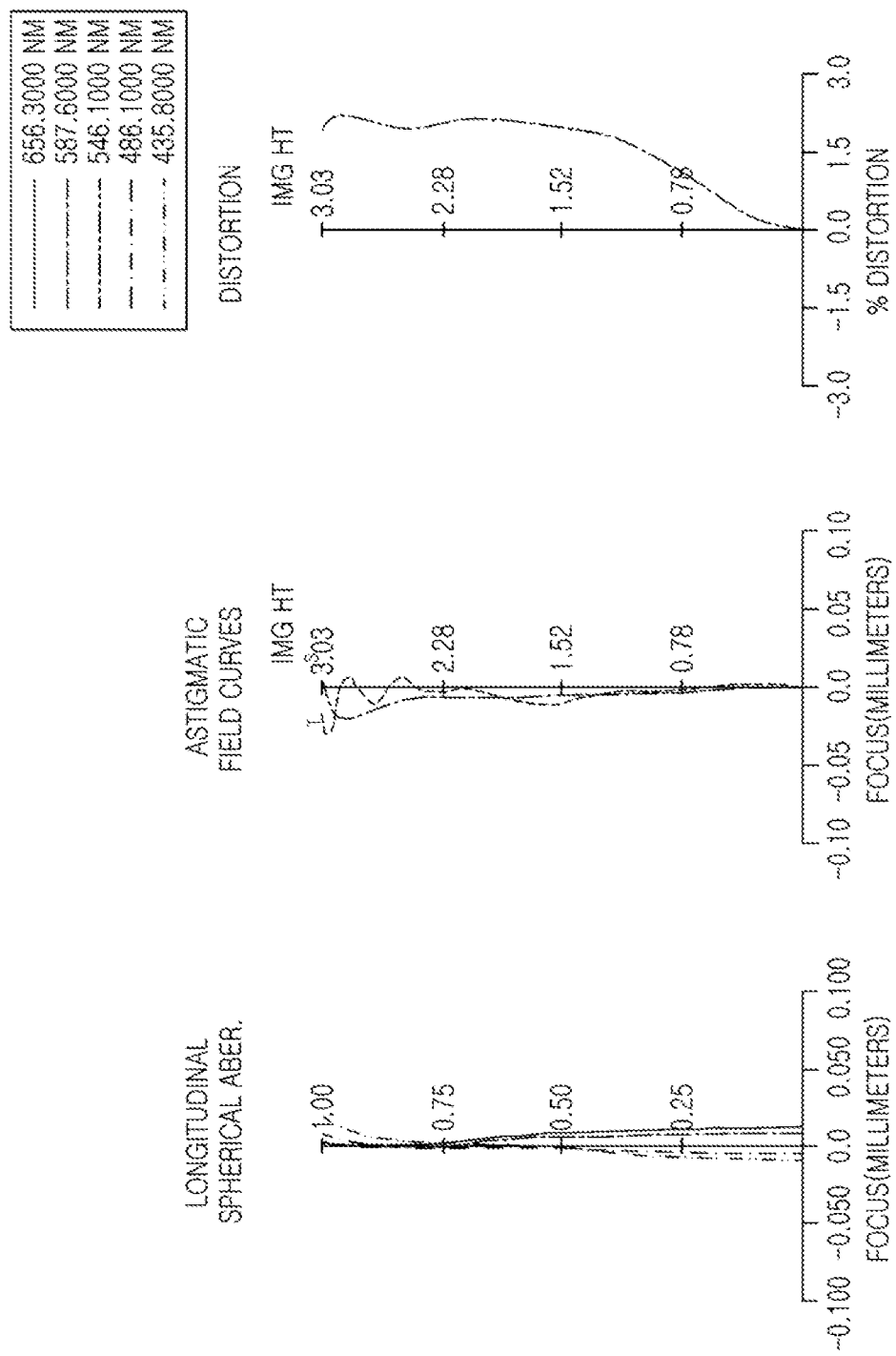
FIG. 12 is graphs having curves illustrating MTF characteristics of the lens module illustrated in FIG. 11.
Figure 13:
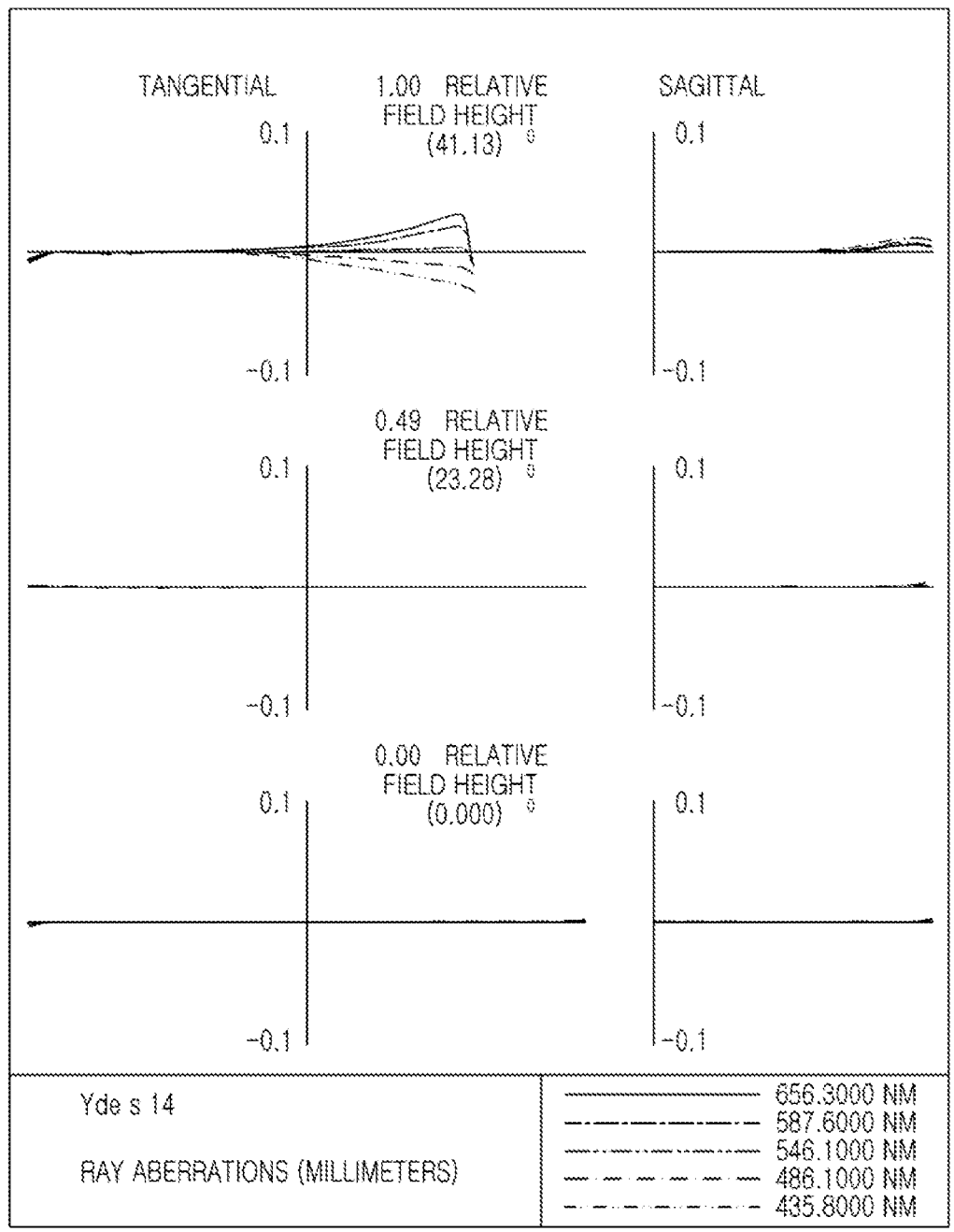
FIG. 13 is graphs having curves illustrating aberration characteristics of the lens module illustrated in FIG. 11.

FIGS. 12 and 13 are graphs having curves illustrating MTF characteristics and aberration characteristics of the lens module.

FIG. 14 is a table illustrating characteristics of the lenses configuring the lens module. In FIG. 14, Surface Nos. 1 and 2 represent the first surface (object-side surface) and the second surface (image-side surface) of the first lens, and Surface Nos. 3 and 4 represent the first and second surfaces of the second lens, respectively. Similarly, Surface Nos. 5 to 10 represent the first and second surfaces of the third to fifth lenses, respectively. In addition, Surface Nos. 11 and 12 represent first and second surfaces of the infrared cut-off filter.

Furthermore, effective radii of the lenses gradually decrease from the object-side surface of the first lens to the image-side surface of the second lens while gradually increasing from the image-side surface of the second lens to the image-side surface of the fifth lens, as illustrated in FIG. 14.

FIG. 15 is a table illustrating aspherical surface coefficients of the lenses configuring the lens module. In FIG. 15, Surface Nos. of the first to fifth lenses are provided in the top row of the table, while characteristics corresponding to respective surfaces of the lenses are provided in columns therebelow.

Figure 16:
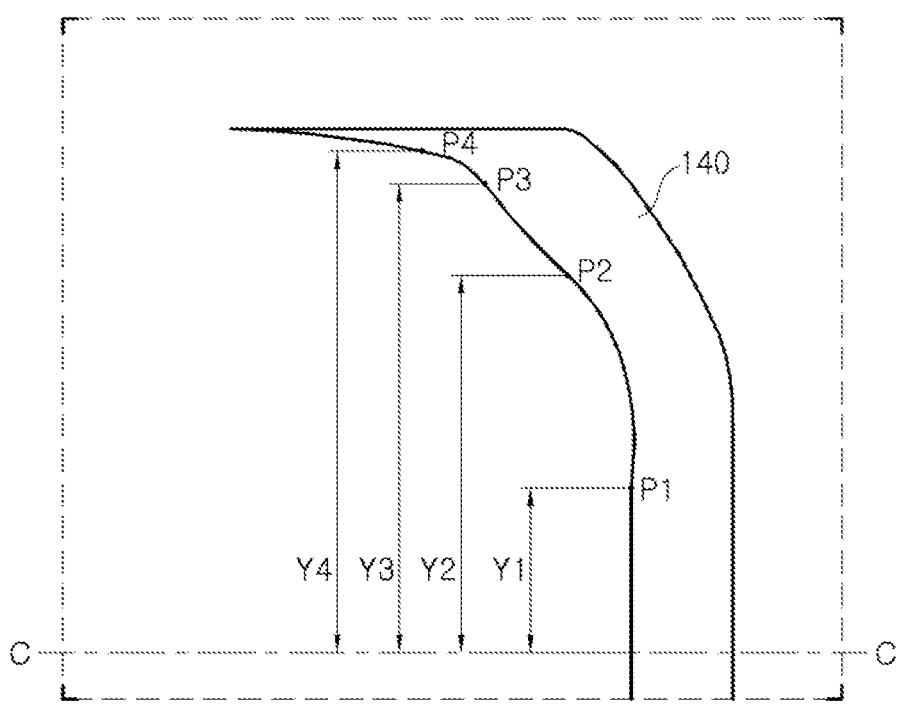
FIG. 16 is an enlarged cross-sectional view of a portion of a fourth lens in the lens module.

The lens module, according to the first to third embodiments, includes the fourth lens having the aspherical surface shape. For example, four or more inflection points are formed on an object-side surface of the fourth lens. A shape of the fourth lens will be described with reference to FIG. 16.

The fourth lens 140 has a shape in which a plurality of inflection points are formed on the object-side surface thereof. For example, as a distance of the fourth lens 140 from an optical axis C-C is increased, the number of inflection points of the fourth lens 140 increases. Four or more inflection points P1, P2, P3, and P4 are formed on the object-side surface of the fourth lens 140. In one example, a distance Y1 from the optical axis C-C to a first inflection point P1 is greater than a distance Y2−Y1 from the first inflection point P1 to a second inflection point P2, and a distance Y3−Y2 from the second inflection point P2 to a third inflection point P3 is greater than a distance Y4−Y3 from the third inflection point P3 to a fourth inflection point P4. The fourth lens 140 having the above-mentioned configuration corrects Petzval field curvature caused in a lens having a meniscus shape.

Table 1 illustrates optical characteristics of the lens modules, according to the first to third embodiments. The lens module has an overall focal length (f) of around 3.20 to around 3.60. In the lens module, a focal length (f1) of the first lens is determined to be within in a range of around 2.50 to around 2.80. In the lens module, a focal length (f2) of the second lens is determined to be within a range of around −7.0 to around −4.0. In the lens module, a focal length (f3) of the third lens is determined to be within a range of around 11.0 to around 22.0. In the lens module, a focal length (f4) of the fourth lens is determined to be within a range of around −120.0 to around −10.0. In the lens module, a focal length (f5) of the fifth lens is determined to be within a range of around −140.0 to around −10.0. In the lens module, an overall length of the optical system is determined to be within a range of around 3.70 to around 4.0. In the lens module, a field of view (FOV) is substantially 80 degrees or more.

TABLE 1

| Remarks | First Embodiment | Second Embodiment | Third Embodiment |
|---|---|---|---|
| f | 3.4178 | 3.3332 | 3.5213 |
| f1 | 2.6630 | 2.5711 | 2.6941 |
| f2 | −5.5419 | −5.1043 | −6.0081 |
| f3 | 15.4727 | 12.7275 | 20.5874 |
| f4 | −113.5093 | −14.0943 | −60.4380 |
| f4 | −12.7749 | −131.6085 | −12.1875 |
| TTL | 3.9400 | 3.9402 | 3.9400 |
| BFL | 0.8793 | 0.9003 | 0.8555 |
| FOV | 82.2000 | 83.1000 | 80.4000 |
| ImgH | 3.0427 | 3.0180 | 3.0385 |
| D2 | 0.04000 | 0.0400 | 0.06182 |
| D11 | 0.11000 | 0.11000 | 0.11000 |
| r10 | 1.16589 | 1.01219 | 1.25569 |

Table 2 shows numerical ranges of Conditional Expressions and values of Conditional Expressions of the lens modules, according to the first to third embodiments.

TABLE 2

| Conditional Expressions | First Embodiment | Second Embodiment | Third Embodiment |
|---|---|---|---|
| TTL/(ImgH*2) | 0.64745 | 0.65279 | 0.64835 |
| D11/TTL*ImgH | 0.08495 | 0.08425 | 0.08483 |
| BFL/f | 0.25728 | 0.27010 | 0.24296 |
| D2/f | 0.01170 | 0.01200 | 0.01756 |
| r10/f | 0.34112 | 0.30367 | 0.35660 |

As seen in Table 2, the lens modules, according to the first to third embodiments, satisfy all of the Conditional Expressions 1 through 9.

As set forth above, according to the embodiments, an optical system with high resolution is obtained.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
   a first lens;
   a second lens;
   a third lens;
   a fourth lens comprising a concave object-side surface and a concave image-side surface; and
   a fifth lens comprising a negative refractive power and an inflection point formed on an image-side surface thereof,
   wherein TTL/(ImgH*2)<0.67 is satisfied, where TTL is a distance from an object-side surface of the first lens to an image sensor, and ImgH is a maximum height of the image sensor,
   the first to fifth lenses are sequentially disposed from an object side to an image side, and
   the lens module has a total of five lenses.

2. The lens module of claim 1, wherein the first lens comprises a positive refractive power.

3. The lens module of claim 1, wherein the second lens comprises a negative refractive power.

4. The lens module of claim 1, wherein the third lens comprises a positive refractive power.

5. The lens module of claim 1, wherein the fourth lens comprises an inflection point formed on an object-side surface of the fourth lens.

6. The lens module of claim 1, wherein the fourth lens comprises an inflection point formed on an image-side surface of the fourth lens.

7. The lens module of claim 1, further comprising a filter, wherein 0.08<(D11/TTL)*ImgH<0.09 is satisfied,
   where D11 is a thickness of the filter.

8. The lens module of claim 1, wherein D2/f<0.12 is satisfied,
   where D2 is a distance from an image-side surface of the first lens to an object-side surface of the second lens, and f is an overall focal length of the lens module.

9. The lens module of claim 1, wherein 0.30<r10/f<0.36 is satisfied,
   where r10 is a radius of curvature of the image-side surface of the fifth lens, and f is an overall focal length of the lens module.

* * * * *